Figure 1:
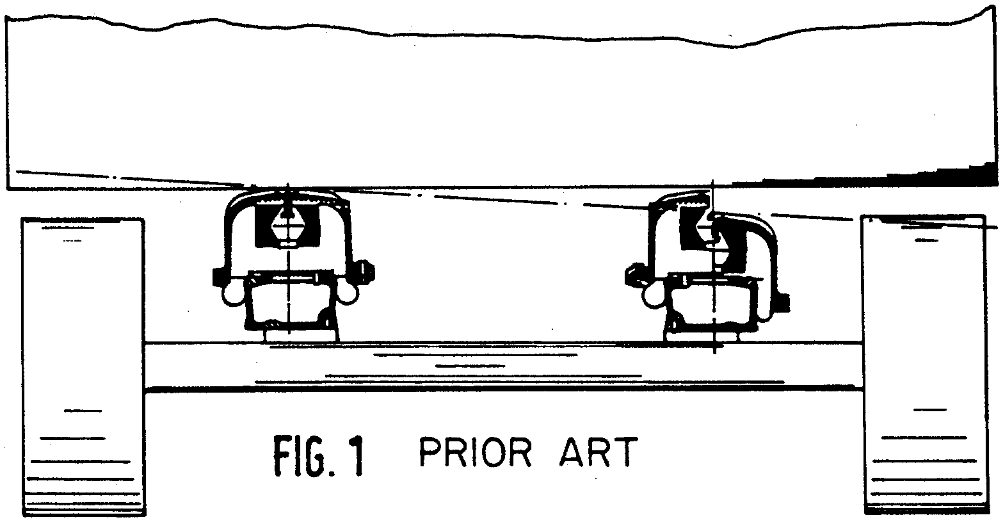

US005193849A

United States Patent [19]

Holzmann

[11] Patent Number: 5,193,849

[45] Date of Patent: Mar. 16, 1993

[54] KNEELING OMNIBUS

[75] Inventor: Stefan Holzmann, Grossnöbach, Fed. Rep. of Germany

[73] Assignee: MAN Nutzfahrzeuge Aktiengesellschaft, München, Fed. Rep. of Germany

[21] Appl. No.: 677,585

[22] Filed: Mar. 29, 1991

[30] Foreign Application Priority Data

Apr. 27, 1990 [DE] Fed. Rep. of Germany ....... 4013673

[51] Int. Cl.[5] ......................... B60G 11/27; G60P 1/16

[52] U.S. Cl. ................................. 280/840; 280/112.2; 280/707; 280/711

[58] Field of Search ........................ 280/840, 6.1, 6.11, 280/6.12, 112.2, 707, 708, 711, 714

[56] References Cited

U.S. PATENT DOCUMENTS

| | | | |
|---|---|---|---|
| 782,520 | 2/1905 | Pearl | 280/840 X |
| 2,784,978 | 3/1957 | Seale | 280/112.2 X |
| 2,912,234 | 11/1959 | Candlin, Jr. | 280/711 X |
| 3,328,019 | 6/1967 | Wilson | 280/840 X |
| 4,036,528 | 7/1977 | Langendorf | 280/6.12 X |
| 4,152,004 | 5/1979 | Schröder | 280/6.12 X |
| 4,238,128 | 12/1980 | McKee | 280/6.1 X |

FOREIGN PATENT DOCUMENTS

| | | | |
|---|---|---|---|
| 1193171 | 10/1959 | France | 280/840 |

*Primary Examiner*—David M. Mitchell
*Assistant Examiner*—Tamara L. Graysay
*Attorney, Agent, or Firm*—Robert W. Becker & Associates

[57] ABSTRACT

A level control system for an omnibus, especially a low-loading omnibus, having an omnibus body supported on axles and wheel suspension, is comprised of a compressed air system that is self-contained for each axle. The following vertical adjustments are possible: during a stop of the omnibus at a bus stop, the omnibus body is pivoted about a longitudinal median floor level axis for lowering the omnibus body at a passenger boarding side and the opposite side is raised by internally pumping the compressed air from the pneumatic springs of the boarding side to the pneumatic springs on the opposite side at each axle. After the completion of the stop at the bus stop, the compressed air is returned to the pneumatic springs on the boarding side so that the omnibus resumes its normal position. In this manner, the compressed air is kept in a self-contained system and is not lost to the atmosphere. Accordingly, there is no need to provide further compressed air to the system, thus reducing the amount of energy required for operating such a system; the power necessary for the internal pumping or transfer of the compressed air is small in comparison.

9 Claims, 4 Drawing Sheets

KNEELING OMNIBUS

BACKGROUND OF THE INVENTION

The invention relates to an omnibus and more particularly to a low loading omnibus whose body is supported by pneumatic springs on the axles or on the wheel suspensions.

In the case of low loading omnibuses in accordance with the prior art there has been the possibility of lowering the omnibus body at a bus stop on the side of the vehicle having the passenger doors in order to render it possible for invalid chairs or the like to be wheeled on board and to alight and for baby carriages to be loaded and unloaded. For this so-called kneeling operation—see FIG. 1 of the drawings—air is discharged from the pneumatic springs on one side into the atmosphere, while the vehicle remains fully supported on the pneumatic spring on the other side of the omnibus. Although this design fulfills the intended purpose to a considerable extent, there is the disadvantage of a large power requirement leading to increased fuel consumption and the emission of more exhaust gas, because for refilling the discharged pneumatic springs for lifting the omnibus body to the normal height compressed air has to be supplied by a compressor.

SHORT SUMMARY OF THE PRESENT INVENTION

Accordingly one object of the invention is to provide means in an omnibus for which substantially less power is necessary for the vertical movement of the omnibus.

A further aim is to provide such a system in which less fuel consumption is involved.

In order to achieve these and/or further aims appearing from the present account, the innovation provides an omnibus, and more particularly a low loading omnibus comprising an omnibus body supported on axles and, respectively, wheel suspensions and a level control system so designed in its parts and function that using a compressed air system, which is self-contained for each axle, the following vertical adjustments of the omnibus body are possible:

a) during stopping of the omnibus at a bus stop, pivoting of the omnibus body generally about a longitudinal median floor level axis for lowering of the omnibus body at a passenger boarding side with at least one door to a boarding level lower than the normal level and simultaneously raising the opposite side of the omnibus by internal pumping of the compressed air from the pneumatic springs on the one boarding and alighting side of the omnibus to the springs on the opposite end of the respective axle, and b) after the completion of such sojourn of the omnibus at the bus stop, return of the compressed air from the springs to the pneumatic springs on the boarding side of the omnibus so that the omnibus reassumes the normal attitude.

Owing to the fact that in the omnibus design in accordance with the invention there is a respective self-contained compressed air system involving the pneumatic springs for each axle, from which, in contradistinction to the prior art no compressed air is left off into the atmosphere for unilateral lowering of the vehicle, and there is simply a pumping of the compressed air between the pneumatic springs of the left side to those on the right side, it is possible to attain the object of the invention in an advantageous manner. For such internal, axle-wise pumping of the compressed air only a comparatively small quantity of additional energy is necessary, which at any rate is substantially less than the quantity of energy necessary for the conventional refilling of the discharged pneumatic springs by operation of a compressor.

Furthermore, the principle in accordance with the invention leads to a whole series of possibilities as regards the internal pumping of the air so that in a particular case the most suitable design may be selected. Examples of such possible designs are recited in the claims.

The invention will now be described in more detail with reference to the accompanying drawings, which show several working embodiments thereof and also a prior art design for purposes of comparison.

LIST OF THE SEVERAL VIEWS OF THE FIGURES

FIG. 1 is a diagrammatic view of a prior art system.

Figure 2:
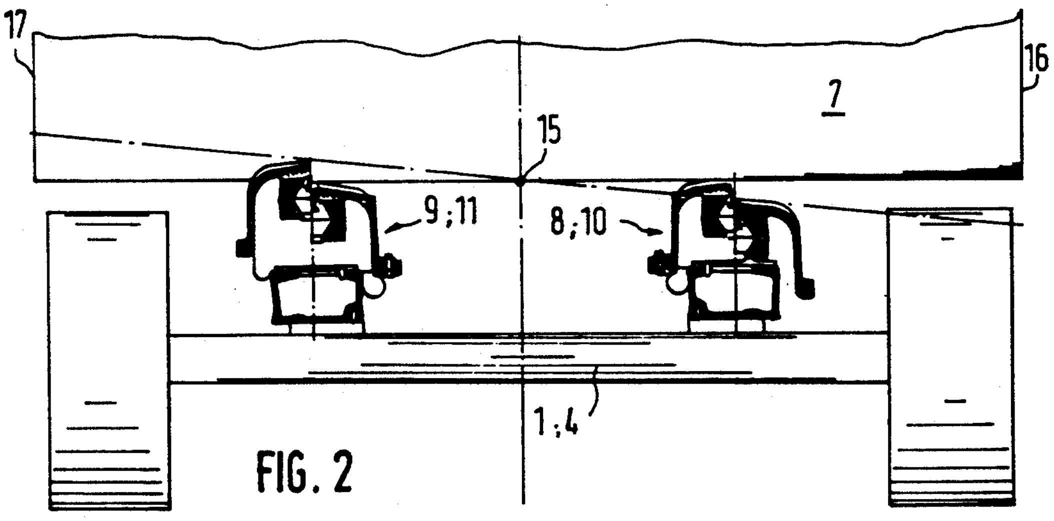

FIG. 2 diagrammatically illustrates the general principle of the invention.

Figure 3:
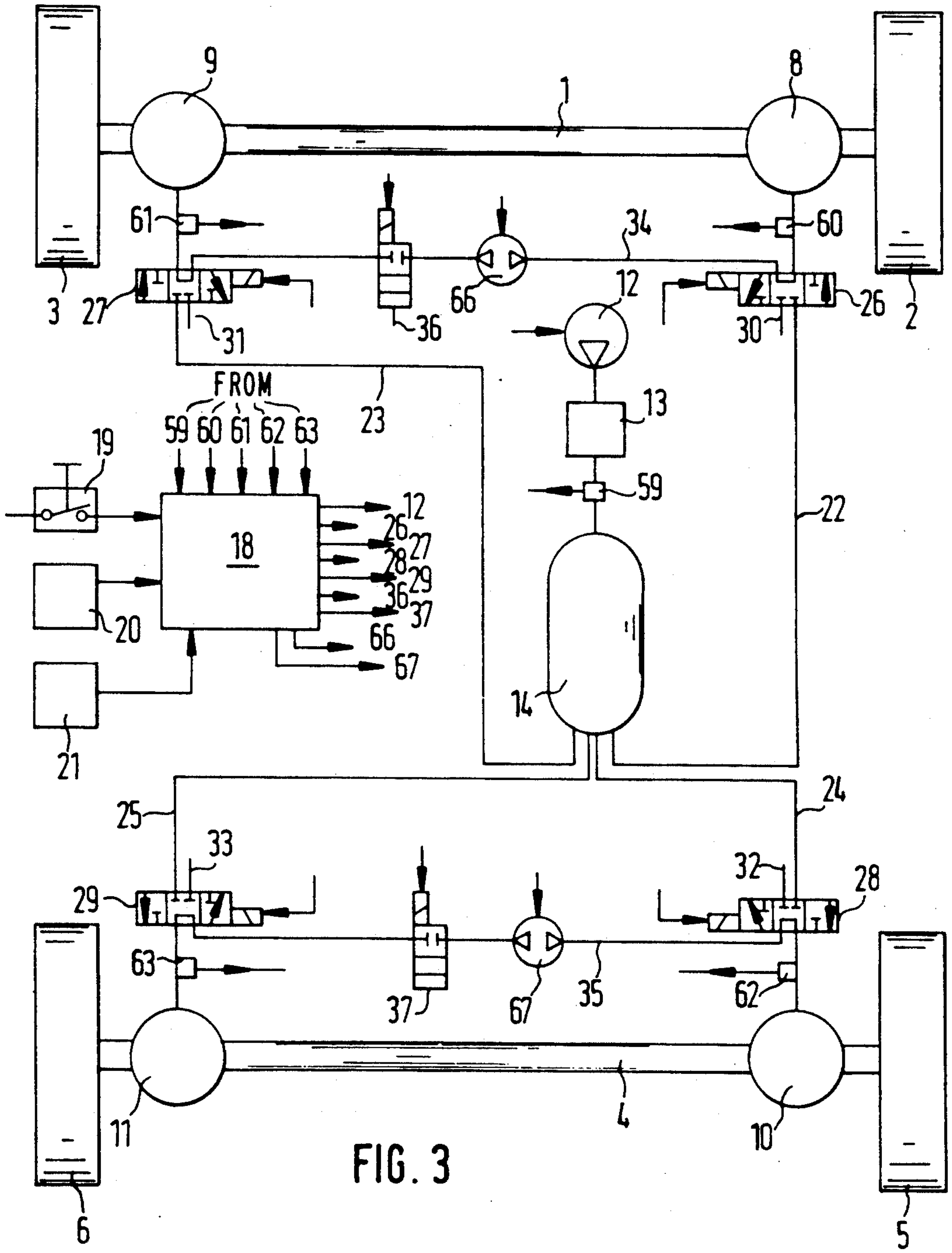
Figure 4:
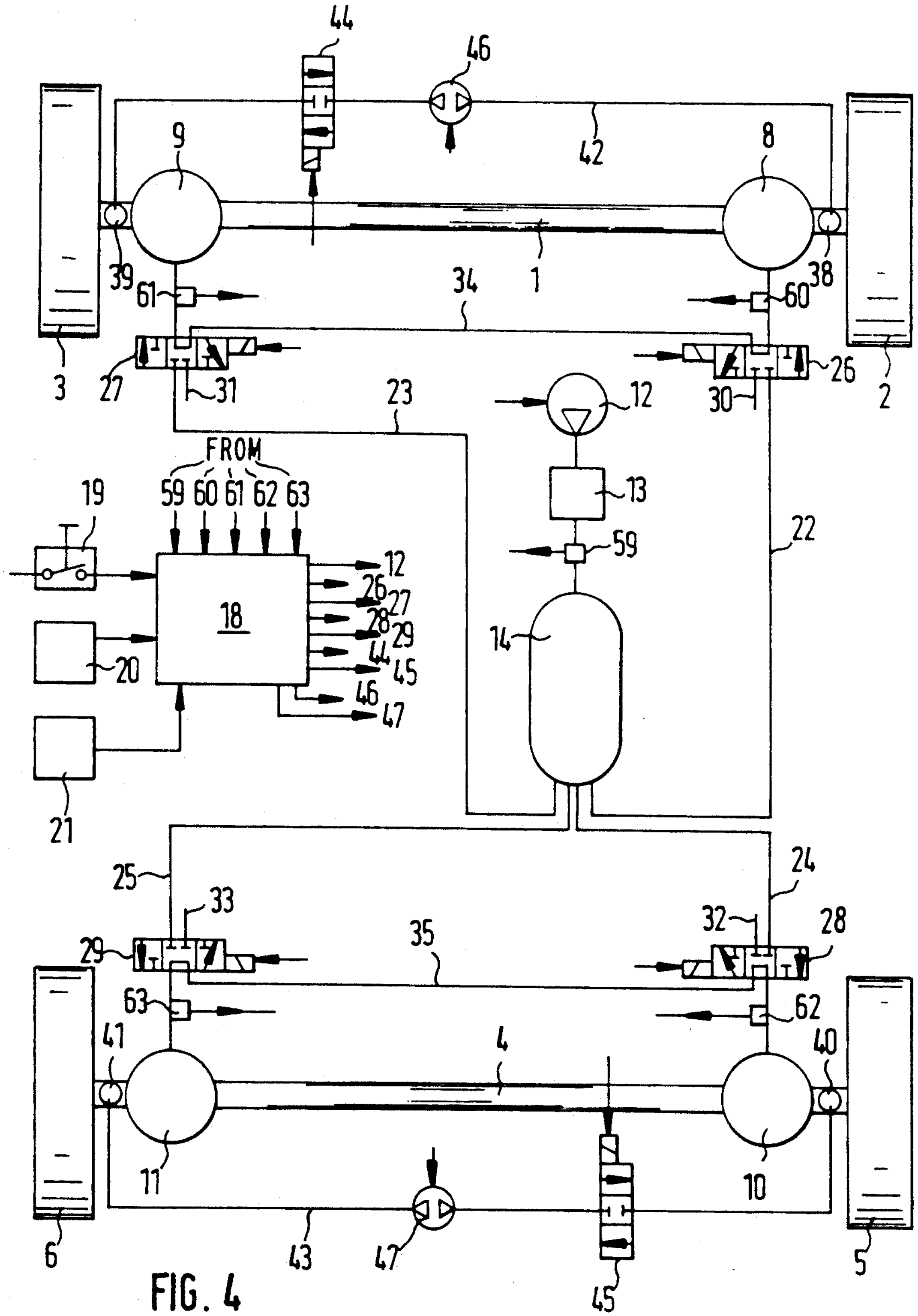
Figure 5:
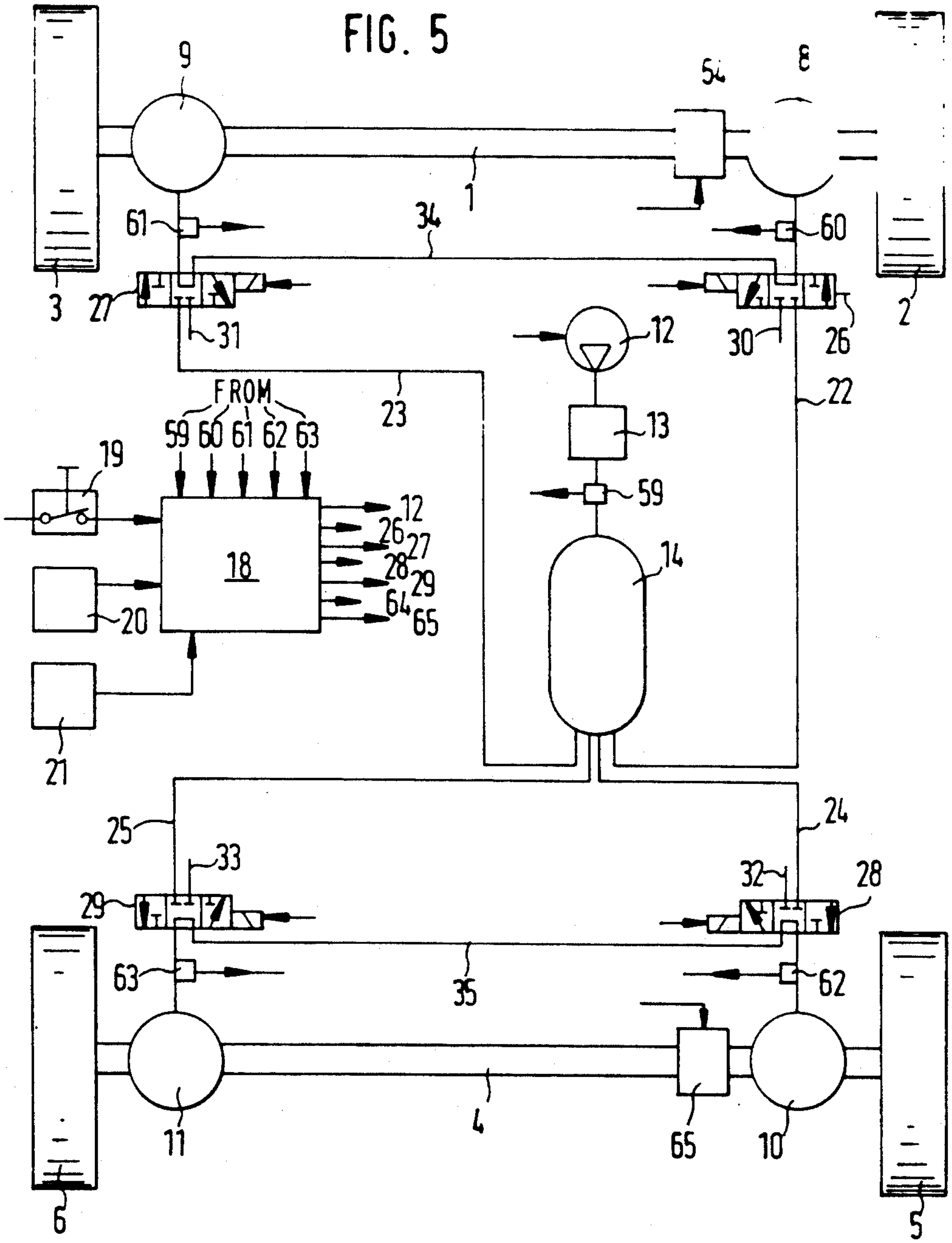

FIG. 3 through 5 respectively diagrammatically illustrate one specific possible configuration in accordance with the invention.

FIG. 6 and

Figure 7:
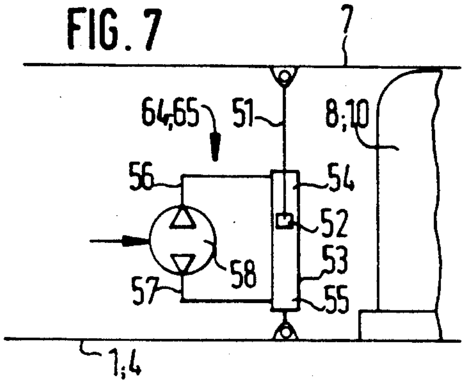

FIG. 7 each diagrammatically show one possible part of the design in accordance with FIG. 5.

DETAILED ACCOUNT OF WORKING EMBODIMENTS OF THE INVENTION

For the purpose of simplification like parts are denoted by like reference characters.

The figures are restricted to parts of a low loading omnibus in accordance with the invention which are necessary for gaining an understanding of the invention, that is to say the front axle 1 with wheels 2 and 3, the rear axle 4 with wheel 5 and 6, the omnibus body 7, and supporting means for the same in the form of pneumatic springs 8, 9, 10 and 11 bearing the body on the axles 1 and 4 and, respectively, the wheel suspensions and furthermore the system necessary for the supply of the pneumatic springs with compressed air in conjunction with the level control system in accordance with the invention.

The compressed air necessary in the omnibus is produced by a compressor 12 and is fed via a pressure regulating valve 13 to a compressed air receiver 14. From the latter the compressed air may be supplied to all pneumatically operated means of the omnibus such as brakes, mechanisms for opening and shutting the doors and the like, not illustrated, and furthermore the pneumatic springs 8, 9, 10 and 11.

The arrangement in accordance with the invention is so designed as regards its parts and the function thereof that—as illustrated in FIG. 2—the omnibus body 7 may be handled as follows using a compressed air system which is individual or self-contained for each axle, that is to say so that:

a) during stopping of the omnibus at a bus stop, pivoting of the omnibus body generally about a longitudinal median floor level axis 15 like a rocking beam for lowering of the omnibus body at a passenger boarding side 16 with at least one door to a boarding level lower than the normal level and simultaneously raising the opposite 17 side of the omnibus by internal pumping of the compressed air in the pneumatic springs from the springs 8 and 10 of the one side of the omnibus to the pneumatic springs 9 and 11 at the opposite axle end thereof, and b) after the completion of such sojourn of the omnibus at the bus stop, return of the compressed air from the pneumatic springs 9 and 11 to the pneumatic springs 8 and 10 on the boarding side of the omnibus so that the omnibus reassumes the normal attitude.

The lowering of the omnibus body 7 in accordance with part (a) of the operation is only possible when an electronic regulating and control device 18 receives a signal from a sensor 19 indicating that the omnibus stop halting brake is being actuated and from a limit value sensor 20 receives a signal that the omnibus is traveling under a certain minimum speed of for instance 3 km per hour. The re-lifting of the omnibus body in accordance with part (b) is furthermore only possible when a sensor 21 feeds a signal to the regulating and control system 18 indicating that the passenger doors are being closed. It is in this manner that the omnibus is rendered safe for operation with passengers.

The advantage of the principle in accordance with the invention is due to the fact that in contradistinction to the prior art as illustrated in FIG. 1 the compressed air is not discharged from the pneumatic springs into the atmosphere and instead is rather only shifted or shunted around in a self-contained compressed air system between the respective pneumatic springs 8 and 9 and respectively, 10 and 11 of a respective axle 1 and, respectively, 4.

For performing these functions there is a series of possibilities, of which some will be described with reference to FIGS. 3 through 7. All the possible designs have the feature in common that for each pneumatic spring 8, 9, 10 and 11 there is an electrically operated level regulating valve 26, 27, 28 and, respectively, 29, which is preferably driven by switching signals from the regulating and control device 18 and such level regulating valve 26 is included in the compressed air supply duct 22, 23, 24 or, respectively, 25 leading to one of the pneumatic springs 8, 9, 10 and 11 from the receiver 14. Each of the level regulating valve is able to assume three switching positions, that is to say a first position, in which the pneumatic springs 8, 9, 10 and 11 are filled with compressed air from the compressed air receiver 14 for setting the omnibus body 7 to the desired level in relation to the road surface, a second position, in which the pneumatic spring 8, 9, 10 and 11 let off compressed air into the atmosphere for the vertical adjustment of the omnibus body 7 to a height lower than the previous height in relation to the road surface, and a third position in which the compressed air supply ducts 22, 23, 24 and 25 and furthermore the discharge outlets 30, 31, 32 and 33 are respectively shut off, while however a respective internal pumping duct 34 and, respectively, 35 between the pneumatic springs 8 and 9 on the one hand and 10 and 11 on the other hand are opened up.

In the case of the design in accordance with FIG. 3 the internal transfer of the compressed air between the pneumatic spring 8 and 9 and, respectively, 10 and 11 for rocking the omnibus body 7 is performed by the switching over, as initiated by the regulating and control device 18, of one respective shut off valve 36 and, respectively, 37, which is normally in the shut position and is included in the transfer duct 34 and, respectively, 35, from such normally shut setting into the open position and the putting into operation of a pump 66 and, respectively, 67 for pumping in the desired direction. The return rocking of the omnibus body 7 out of the rocked position into the normal position may however also be performed without the aid of the pumps 66 and 67 by equalization of the pressure between the pneumatic springs 9 and 8 and, respectively, 11 and 10.

In the case of the design in accordance with FIG. 4 the internal pumping of the compressed air between the pneumatic springs 8 and 9 and, respectively, 10 and 11 for rocking the omnibus body 7 is performed by an electrohydraulic device with which the effective length of the shock absorbers 38, 39, 40 and 41 associated with the pneumatic spring 8, 9, 10 and 11 in the omnibus on the running gear may be suitably modified in conjunction with transfer ducts 34 and 35 which are in the open condition, the said electrohydraulic device having, for each connecting duct 42 and, respectively, 43 between the pressure spaces of the shock absorbers 38 and 39, respectively, 40 and 41 and in each of these connecting ducts 42 and 43 a respective change of direction and shut off valves 44 and, respectively, 45 and a respective electric motor-driven reversible pump 46 and, respectively, 47 and for internal transfer pumping in response to the regulating and control device 18 the change of direction and shut off valve 44 and 45 are switched over into the respective on position and the pump 46 and 46 are operated in the respective direction of pumping. In this respect oil under pressure is drawn off out of the pressure spaces of the shock absorbers 38 and 40 and fed into the shock absorbers 39 and 41 which are at opposite ends of the axles with the consequence that the omnibus body 7 is moved downwards on the side 16 with the passengers doors while the opposite side 17 is lifted and simultaneously the compressed air is expelled from the pneumatic springs 8 and 10 on the boarding side and via the transfer ducts 34 and 35 in pumped into the pneumatic springs 9 and 11 at the other end of the axle. For return rocking movement of the omnibus body 7 into the normal position the above mentioned operations are performed in reverse with the pumps 46 and 47 functioning in the opposite direction of flow.

Figure 6:
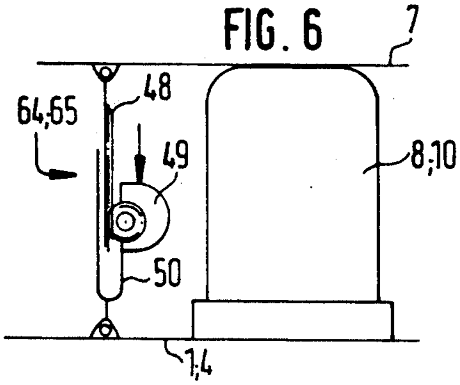

In the design in accordance with FIGS. 5 through 7 the internal transfer pumping of the compressed air between the pneumatic springs 8 and 9 and, respectively 10 and 11 for rocking the omnibus body 7 is performed by an electromechanical device (FIG. 6) or by an electrohydraulic lifting mechanism (FIG. 7) 64 and, respectively, 65, with which the distance between the omnibus body 7 and the axles 1 and 4 at the respective pneumatic spring 8, 9, 10 and 11 may be reset, in conjunction with the transfer ducts 34 and 35 (which are not shut off). The at least one electromechanical lifting mechanism 64 and, respectively, 65 for each axle 1 and 4 adjacent to a pneumatic spring 8 and 10 and possibly also 9 and 11, may—as shown in FIG, 6—consist of a rack 48, which is pivoted on the respective axle 1 and, respectively, 4 or on the omnibus body 7, and of a geared electric motor 49 adapted to act on the latter, the said electric motor having a freewheel which allows the resilient movement of the omnibus body 7 when traveling and which is attached to a support member 50, which is oppositely pivoted in the omnibus body 7 and, respectively, the axle 1 and, respectively, 4 and simultaneously also guides the rack 48. In order to pivot the omnibus body 7 the geared electric motor 49 responds to a switching signal from the regulating and control device 18 whereupon the electric motor 49, rotating in the appropriate direction, acts via the rack 48 to draw down the omnibus body 7 on the passenger door side 16 towards the axle 1 and, respectively, 4 so that the compressed air is forced out of the pneumatic spring 8 and 10 on the passenger door side and via the transfer ducts 34 and 35, which have been opened by the height control valve, the air is fed into the pneumatic springs 9 and 11 at the opposite end of the axle, so that the rocking of the omnibus body 7 is aided. For the return rocking of the omnibus body 7 the geared electric motor 49 is moved back into its initial position.

In lieu of the above described electromechanical lifting mechanism 64 and 65 it is possible for the lifting mechanism to have an electrohydraulic arrangements as illustrated in FIG. 7. In this case it consists of a piston and cylinder unit, which is connected at one end on the vehicle body 7 and at the other end on the axle 1 and, respectively, 4 and whose piston 52, which is connected with a piston rod 51, separates two pressure spaces 54 and 55 from each other in the cylinder 53, and of a reversible pump 58, which is electrically driven and has its ports 56 and 57 connected with a respective one of the two pressure spaces 54 and 55. In order to rock the omnibus body 7 the pump 58 receives a switching signal from the regulating and control device 18 whereupon the pump, rotating in the appropriate direction, pumps hydraulic oil from the one pressure space 54 or, respectively, 55 and pumps it into the other pressure space 55 and, respectively, 54 so that the piston 52 is correspondingly shifted in the cylinder. In order to lower the omnibus body 7 on the passenger door side the piston 52 is forced downwards so that the omnibus body 7 is drawn down towards the axle 1 and, respectively, 4, compressed air is able to leave the pneumatic spring 8 and 10 on the passenger door side and via the transfer ducts 34 and 35 opened by the height control valve compressed air is fed into the pneumatic springs 9 and 11, which are at the opposite end of the axle so that the rocking effect on the omnibus body 7 is assisted. In order to rock back the omnibus body 7 into its normal position the pumps 58 of each lifting mechanism 64 and 65 are operated in the opposite direction so that the above mentioned operations take place in the reverse order.

Independently of the respective design utilized the compressed air system includes a plurality of pressure sensors 59 (to sense the pressure in the compressed air receiver 14), 60 (to sense the pressure in the pneumatic spring 8), 62 (for the pressure in the pneumatic spring 9), 62 (for the pressure in the pneumatic spring 10) and 63 (to detect the pressure in the pneumatic spring 11), which pass on the sensed pressure data as actual values to the regulating and control device 18. These actual pressure values then undergo comparison therein with set points to evolve the necessary measures to be taken, for instance utilizing a microprocessor, and suitable command signals are then transmitted via conductors to the parts which are to be controlled, i.e. 12, 26, 27, 28, 29, 36, 37, 66, 67 (FIG. 3), 12, 26, 27, 28, 29, 44, 45, 46, 47 (FIG. 4), 12, 26, 27, 28, 29, 64 (then 49 or 58) and, respectively, 65 (then 49 or 58, in FIGS. 5 through 7). On the basis of the pressure values sensed by the sensors of the pneumatic spring 8, 9, 10 and 11 the degree of vertical adjustment or, respectively, the angle of pivot of the omnibus body 7 in relation to the road surface and, respectively, to the axles 1 and, respectively, 4, may be determined.

I claim:

1. An omnibus having an omnibus body that is supported on axles or wheel suspensions via respective pneumatic springs disposed at opposite ends of said axles, comprising:

a level control system having a compressed air system that is self-contained for each of said axles and operating such that said omnibus body is pivotable about a longitudinal median floor level axis, whereby means on a passenger boarding side of said omnibus body permit lowering of said omnibus body to a boarding level that is lower than a normal level and again raising of said omnibus body back to said normal level, while simultaneously means on an opposite side of said omnibus body permit raising and lowering of said omnibus body from and again back to said normal level, including means for effecting transfer of compressed air between said pneumatic springs disposed at opposite ends of respective ones of said axles such that compressed air is transferred from said pneumatic springs on said boarding side to said pneumatic springs on said opposite side for effecting said lowering of said boarding side and simultaneously said raising of said opposite side, and, subsequently, compressed air is transferred from said pneumatic springs on said opposite side to said pneumatic springs on said boarding side for returning said omnibus body to said normal level;

further including a compressed air receiver and respective compressed air supply ducts leading from said compressed air receiver to respective ones of said pneumatic springs;

said lowering and raising means being respective electrically controlled level regulating valves, a respective one of which is disposed in each of said compressed air supply ducts; and said means for effecting transfer of compressed air including: respective transfer lines extending between said pneumatic springs of a respective one of said axles, a respective shut off valve disposed in each of said transfer lines, and a respective electric motor-driven reversible pump disposed in each of said transfer lines.

2. An omnibus having an omnibus body that is supported on axles or wheel suspensions via respective pneumatic springs disposed at opposite ends of said axles, comprising:

a level control system having a compressed air system that is self-contained for each of said axles and operating such that said omnibus body is pivotable about a longitudinal median floor level axis, whereby means on a passenger boarding side of said omnibus body permit lowering of said omnibus body to a boarding level that is lower than a normal level and again raising of said omnibus body back to said normal level, while simultaneously means on an opposite side of said omnibus body permit raising and lowering of said omnibus body from and again back to said normal level, including means for effecting transfer of compressed air between said pneumatic springs disposed at opposite ends of respective ones of said axles such that compressed air is transferred from said pneumatic springs on said boarding side to said pneumatic springs on said opposite side for effecting said lowering of said boarding side and simultaneously said raising of said opposite side, and, subsequently, compressed air is transferred from said pneumatic springs on said opposite side to said pneumatic springs on said boarding side for returning said omnibus body to said normal level;

further including a compressed air receiver, respective compressed air supply ducts leading from said compressed air receiver to respective ones of said pneumatic springs, and respective shock absorbers associated with each of said pneumatic springs;

said lowering and raising means being respective electrically controlled level regulating valves, a respective one of which is disposed in each of said compressed air supply ducts; and said means for effecting transfer of compressed air including: respective transfer lines extending between said pneumatic springs of a respective one of said axles, and for each of said axles a respective electrohydraulic device for varying the effective length of said shock absorbers of said axle.

3. An omnibus according to claim 2, in which each of said electrohydraulic devices comprises: a connecting line that extends between hydraulic pressure spaces of said shock absorbers of a respective one of said axles, a respective electrically controlled reversing and shut off valve disposed in each of said connecting lines, and a respective electric motor-driven reversible pump disposed in each of said connecting lines.

4. An omnibus having an omnibus body that is supported on axles or wheel suspensions via respective pneumatic springs disposed at opposite ends of said axles, comprising:

a level control system having a compressed air system that is self-contained for each of said axles and operating such that said omnibus body is pivotable about a longitudinal median floor level axis, whereby means on a passenger boarding side of said omnibus body permit lowering of said omnibus body to a boarding level that is lower than a normal level and again raising of said omnibus body back to said normal level, while simultaneously means on an opposite side of said omnibus body permit raising and lowering of said omnibus body from and again back to said normal level, including means for effecting transfer of compressed air between said pneumatic springs disposed at opposite ends of respective ones of said axles such that compressed air is transferred from said pneumatic springs on said boarding side to said pneumatic springs on said opposite side for effecting said lowering of said boarding side and simultaneously said raising of said opposite side, and, subsequently, compressed air is transferred from said pneumatic springs on said opposite side to said pneumatic springs on said boarding side for returning said omnibus body to said normal level;

further including a compressed air receiver and respective compressed air supply ducts leading from said compressed air receiver to respective ones of said pneumatic springs;

said lowering and raising means being respective electrically controlled level regulating valves, a respective one of which is disposed in each of said compressed air supply ducts; and said means for effecting transfer of compressed air including: respective transfer lines extending between said pneumatic springs of a respective one of said axles, and for each of said axles a respective lifting mechanism for varying the distance between said omnibus body and that axle in the vicinity of one end thereof.

5. An omnibus according to claim 4, in which each of said lifting mechanisms is an electromechanical lifting mechanism that comprises: a rack that is pivotably connected to one of said omnibus body and the pertaining axle; a support member that is pivotably connected to the other of said pertaining axle and said omnibus body opposite the pivot point of said rack and guides same; and a freewheel geared electric motor that is disposed on said support member and acts upon said rack.

6. An omnibus according to claim 4, in which each of said lifting mechanisms is an electrohydraulic lifting mechanism that comprises: a cylinder that is pivotably connected to one of said omnibus body and the pertaining axle; a piston having a piston rod that is pivotably connected to the other of said pertaining axle and said omnibus body, with said piston being accommodated in said cylinder and dividing same into two pressure spaces; and an electric motor-driven reversible pump that communicates with both of said pressure spaces of said cylinder.

7. An omnibus having an omnibus body that is supported on axles or wheel suspensions via respective pneumatic springs disposed at opposite ends of said axles, comprising:

a level control system having a compressed air system that is self-contained for each of said axles and operating such that said omnibus body is pivotable about a longitudinal median floor level axis, whereby means on a passenger boarding side of said omnibus body permit lowering of said omnibus body to a boarding level that is lower than a normal level and again raising of said omnibus body back to said normal level, while simultaneously means on an opposite side of said omnibus body permit raising and lowering of said omnibus body from and again back to said normal level, including means for effecting transfer of compressed air between said pneumatic springs disposed at opposite ends of respective ones of said axles such that compressed air is transferred from said pneumatic springs on said boarding side to said pneumatic springs on said opposite side for effecting said lowering of said boarding side and simultaneously said raising of said opposite side, and, subsequently, compressed air is transferred from said pneumatic springs on said opposite side to said pneumatic springs on said boarding side for returning said omnibus body to said normal level;

further including a compressed air receiver and respective compressed air supply ducts leading from said compressed air receiver to respective ones of said pneumatic springs;

said lowering and raising means being respective electrically controlled level regulating valves, a respective one of which is disposed in each of said compressed air supply ducts, with each of said level regulating valves having a discharge outlet; and said means for effecting transfer of compressed air including respective transfer lines extending between said pneumatic springs of a respective one of said axles, with each of said level regulating valves having three switched positions, namely: a first position in which, for setting the level of said omnibus body to a desired level relative to a roadway, said pneumatic springs are filled with compressed air from said compressed air receiver via said compressed air supply ducts; a second position in which, for setting the level of said omnibus body to a level that is lower than said level in said first position, compressed air is released from said pneumatic springs into the atmosphere; and a third position in which both said compressed air supply ducts and said discharge outlets are shut off, while said transfer lines are open for the transfer of air between said pneumatic springs.

8. An omnibus according to claim 7, which includes a regulating and control device for issuing signals for controlling said level regulating valves.

9. An omnibus according to claim 8, in which said compressed air system further comprises a series of pressure sensors for detecting the actual pressure values in said compressed air receiver and each of said pneumatic springs and conveying such values to said regulating and control device, which performs a comparison of said actual pressure values with preset desired values and computes appropriate control signals that are transmitted via control lines to said various means.

* * * * *